United States Patent
Lutz

(10) Patent No.: US 8,613,237 B2
(45) Date of Patent: Dec. 24, 2013

(54) STEERING ARRANGEMENT WITH ROTATABLE STEERING HANDLE

(75) Inventor: Christian Lutz, Nueziders (AT)

(73) Assignee: Thyssenkrupp Presta Aktiengesellschaft, Eschen (LI)

( * ) Notice: Subject to any disclaimer, the term of this patent is extended or adjusted under 35 U.S.C. 154(b) by 531 days.

(21) Appl. No.: 12/861,268

(22) Filed: Aug. 23, 2010

(65) Prior Publication Data

US 2010/0319481 A1    Dec. 23, 2010

Related U.S. Application Data

(63) Continuation of application No. PCT/AT2009/000063, filed on Feb. 19, 2009.

(30) Foreign Application Priority Data

Feb. 28, 2008   (DE) .................. 10 2008 011 621

(51) Int. Cl.
   *B62D 1/16*   (2006.01)

(52) U.S. Cl.
   USPC .............................................. 74/492; 340/438

(58) Field of Classification Search
   USPC .................. 74/492, 493; 180/422, 446
   See application file for complete search history.

(56) References Cited

U.S. PATENT DOCUMENTS

| | | | |
|---|---|---|---|
| 4,586,032 A * | 4/1986 | Seko et al. ................. | 340/576 |
| 5,802,221 A | 9/1998 | Lüthi et al. | |
| 6,097,286 A * | 8/2000 | Discenzo ................... | 340/465 |
| 6,437,687 B2 * | 8/2002 | Spencer ..................... | 340/425.5 |
| 7,096,991 B2 * | 8/2006 | Keutz ......................... | 180/271 |
| 7,165,786 B1 * | 1/2007 | Sha et al. ................... | 280/775 |

FOREIGN PATENT DOCUMENTS

| | | |
|---|---|---|
| DE | 103 06 100 | 9/2004 |
| DE | 10 2004 062 820 | 7/2006 |
| EP | 1 410 972 | 4/2004 |
| EP | 1 777 094 | 4/2007 |
| WO | 2006/069915 | 7/2006 |
| WO | 2009/092527 | 1/2009 |

OTHER PUBLICATIONS

International Search Report issued Apr. 27, 2009 in International (PCT) Application No. PCT/AT2009/000063.

* cited by examiner

*Primary Examiner* — William C Joyce
*Assistant Examiner* — Terence Boes
(74) *Attorney, Agent, or Firm* — Wenderoth, Lind & Ponack, LLP.

(57) ABSTRACT

A steering arrangement for a motor vehicle includes a rotatable steering handle, in particular a steering wheel, and a steering spindle connected torsion-tight therewith. At least one generator device is provided for generating at least one haptic signal, and at least one rocker bar is fixed on a structural part of the steering arrangement in a fixing region. On the rocker bar, a pinging hammer is held such that it is deflectable with respect to the fixing region, and the rocker bar for the deflection of the pinging hammer is connected with the generator device. The pinging hammer can be brought into contact with a structural part of the steering arrangement.

21 Claims, 8 Drawing Sheets

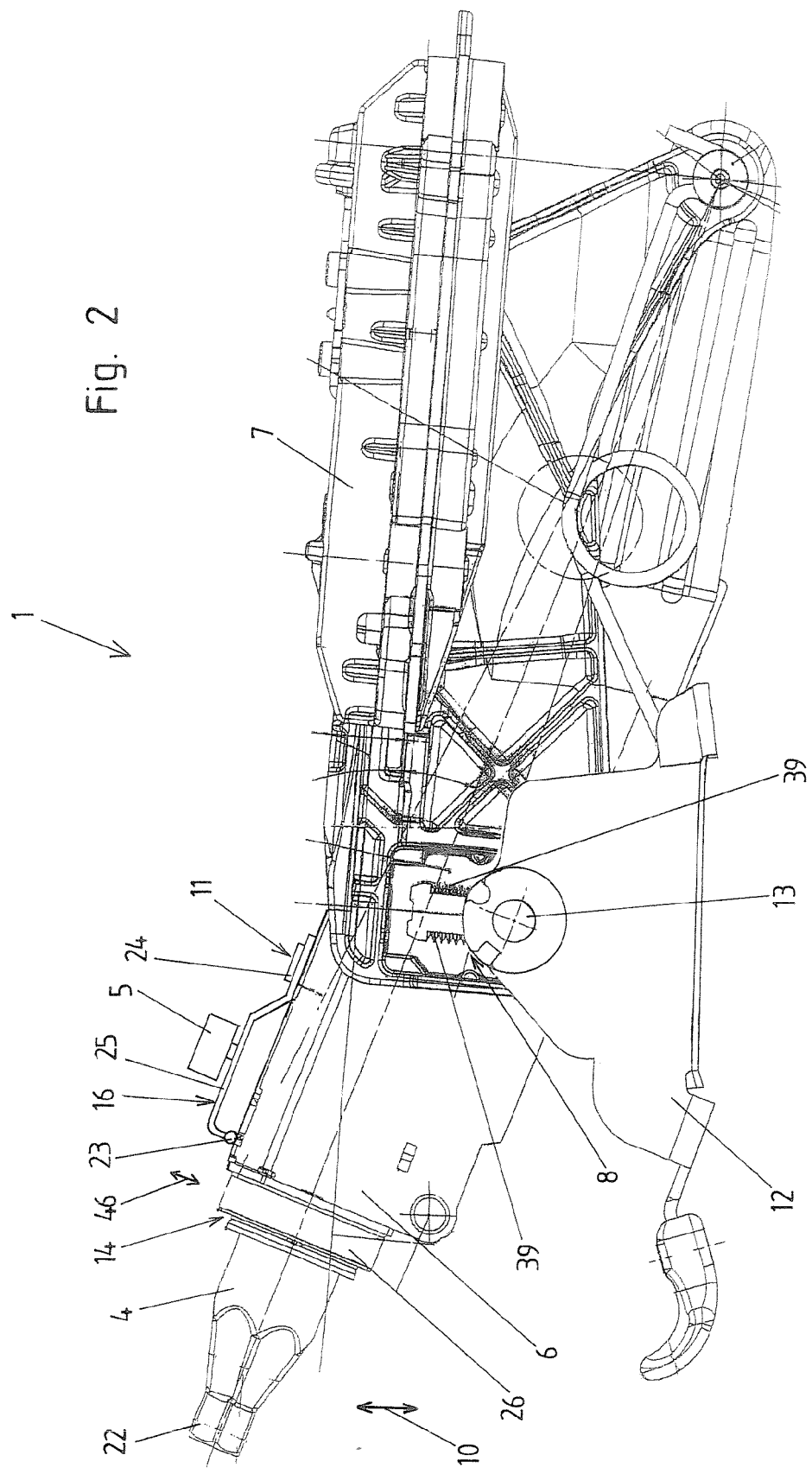

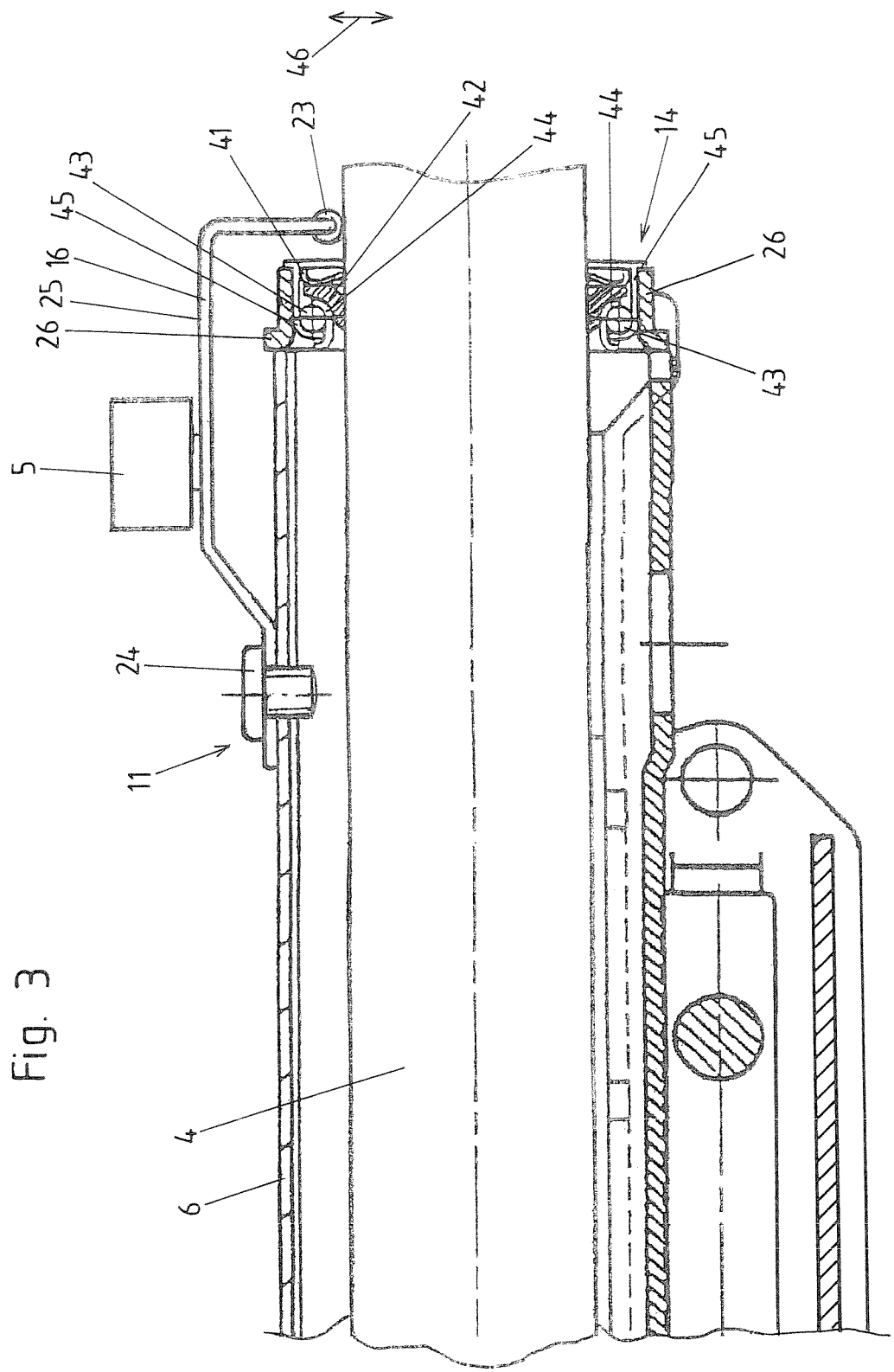

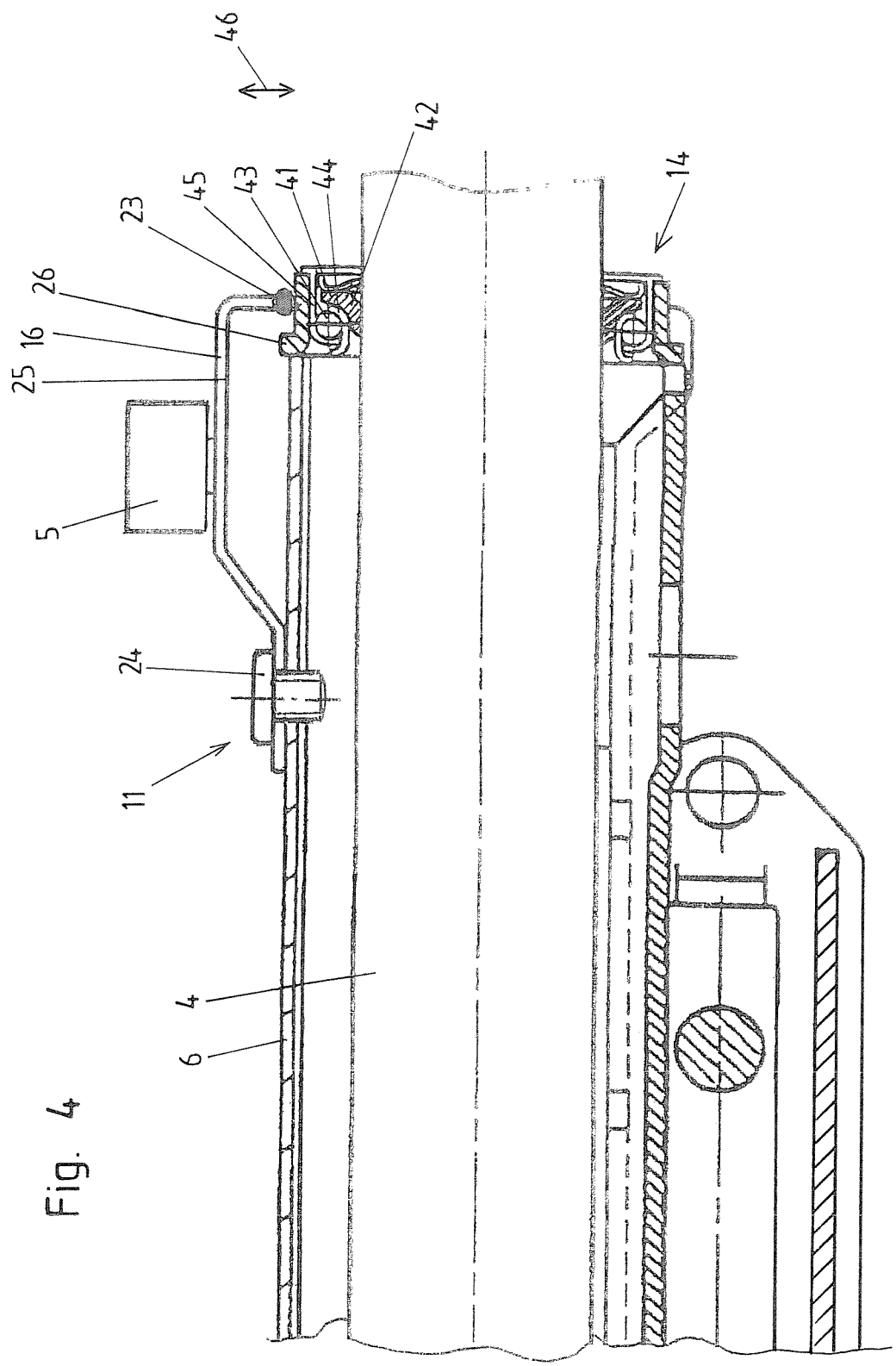

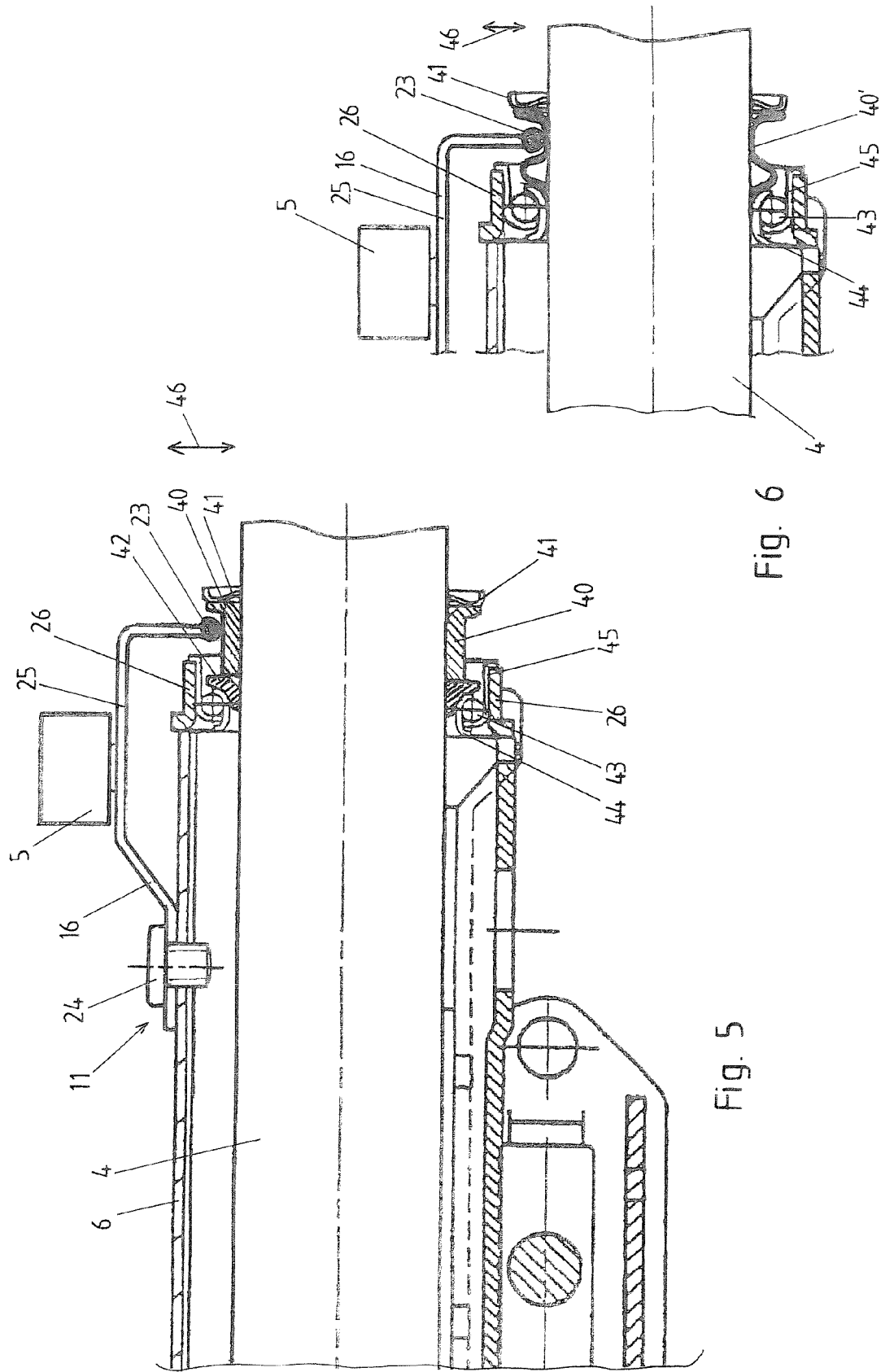

STEERING ARRANGEMENT WITH ROTATABLE STEERING HANDLE

This application is a Continuation application of International application PCT/AT2009/000063, filed Feb. 19, 2009, the entire disclosure of which is incorporated herein by reference.

BACKGROUND OF THE INVENTION a) Field of the Invention

The present invention relates to a steering arrangement for a motor vehicle with a rotatable steering handle, in particular a steering wheel, and a steering spindle connected torsion-tight therewith and at least one generator device for at least one mechanical vibration, in particular a haptic signal.

b) Description of Related Prior Art

The fundamental idea of the steering arrangement known per se, with a generator device for at least one haptic signal, is conveying a signal, in particular a warning signal, to the driver of the motor vehicle via the tactile sense of his hands. It is in principle conceivable to integrate the generator device directly into the steering handle or the steering wheel. However, since a steering wheel must always be suspended such that it is rotatable, problems are encountered here regarding the signal transmission onto the steering wheel. While this can be solved by using contact rings or twisted wires or the like, it is, however, always relatively complex.

Another approach for transmitting haptic signals onto a steering wheel is disclosed in DE 10 2004 062 820 A1. In this publication, a rechargeable mechanical energy store, for example in the form of a torsionable elastic body, is proposed, which, by means of frictional closure, acts, optionally via a reversing wheel or directly, onto the steering spindle connected with the steering wheel. While the necessity of the signal transmission by means of contact rings or twisted wires is hereby avoided, there is nevertheless a relatively complex additional part necessary in order to be able to transmit the haptic signals onto the steering wheel. It appears moreover questionable whether or not the transmission by frictional closure proposed in this publication operates reliably over the long term.

A solution including a form-closure transmission of a haptic signal onto a steering column of a motor vehicle is proposed in DE 10 306 100 A1. Here, via the meshing of several toothings one into the other, a haptically perceivable, direction-selective and pulse-like applied torque is transmitted as a function of a direction discrepancy, acquired by an acquisition system, onto the steering column and therewith onto the steering wheel. The arrangements depicted in DE 10 306 100A1 also are technically relatively complex.

SUMMARY OF THE INVENTION

The invention addresses the problem of proposing an alternative solution regarding the manner in which, with as simple a construction as possible, a mechanical vibration or a haptic signal can be transmitted onto a steering handle or a steering wheel in a generic steering arrangement.

Toward this solution it is proposed that the steering arrangement comprises at least one rocker bar fixed in place in a fixing region on a structural part of the steering arrangement. On the rocker bar, a pinging hammer is held deflectable with respect to the fixing region and, for the deflection of the pinging hammer, the rocker bar is in connection with the generator device and the pinging hammer can be brought into contact with a structural part of the steering arrangement.

For the generation of the mechanical vibration, a rocker bar is consequently provided which, on the one hand, can be fixedly secured with its fixing region on a structural part of the steering arrangement, and, on the other hand, holds a pinging hammer which, via the rocker bar, can be deflected at the end opposite to the fixing region and, preferably jointly with the rocker bar or a portion of the rocker bar, can be set into vibrating motion. For generating the vibration motion, the generator device is provided, which is connected with the rocker bar. Through the mechanical vibration, the pinging hammer can be brought into contact with a structural part of the steering arrangement. As a result, upon actuation of the generator device, the pinging hammer is set into vibration and impinges against a structural part of the steering arrangement. This vibration generated on the structural part of the steering arrangement can subsequently be transmitted, optionally via several other structural parts of the steering arrangement, onto the steering spindle and therewith onto the steering handle or the steering wheel, such that upon the generator device being actuated, a haptic signal, thus a signal perceptible by the hand of the driver on the steering handle can be generated. Alternatively or additionally, the mechanical vibration thus generated can be audible in the motor vehicle passenger compartment. With this in mind, consequently a haptic and/or an acoustic signal is generated. Expressed simply, the steering arrangement thus includes a type of bell, which can optionally generate haptic signals, thus signals perceptible by the hand, as well as also acoustic signals, thus audible signals.

To be able to set the pinging hammer into vibration, the rocker bar comprises advantageously at least one lamella, which can preferably be set into mechanical vibration by means of the generator device, on which lamella the pinging hammer can be held directly or indirectly. The lamella is herein the movable or elastically deformable part. The rocker bar can be entirely comprised of such an elastic lamella or one that can be set into vibration. However, it is also feasible for the rocker bar per se to include rigid parts which are connected with the lamella. It is alternatively also conceivable to implement the entire rocker bar such that it is substantially rigid and to affix it via an articulation on the structural part of the steering arrangement, wherein, in this case, a spring should be provided which sets into prestress the articulation and therewith the rocker bar. The pinging hammer and/or the rocker bar can thus be implemented as a single part or as multiple parts.

In its resting position, in which the generator device is switched off, the pinging hammer can be in contact on the structural part of the steering device with which it can be brought into contact. It is equally well feasible for the pinging hammer in the resting position to be spaced apart from the structural part of the steering arrangement with which it can be brought into contact. By switching on the generator device, the pinging hammer in both variants can be temporarily brought into contact with the structural part of the steering arrangement and is also raised again from this structural part, whereby an impacting or pinging signal results which is audible as well as also tactile to the driver and optionally also to other motor vehicle passengers.

The pinging hammer is advantageously disposed on the rocker bar at a spacing from the fixing region. It is herein especially preferred if the fixing region forms the one end of the rocker bar and the pinging hammer is disposed at the opposite end thereto of the rocker bar or the lamella.

Regarding the generator device, it is, firstly, important that it is in contact with the rocker bar so that it can set it into vibration. There are fundamentally several feasibilities to achieve such. An especially simple, yet reliably working variant provides that the generator device on the rocker bar engages between the fixing region and the pinging hammer, preferably in the proximity of the lamella. It is, in turn, advantageous if the generator device is borne, preferably exclusively, by the rocker bar or the optionally provided lamella. This should be understood to the effect that, preferably exclusively, the rocker bar holds the generator device in position against the force of gravity. It is herein insignificant whether or not the generator device, beyond that, is in contact with connection cables or the like. It is alternatively also feasible to dispose the generator device in the fixing region of the rocker bar, wherein the rocker bar or a lamella of the rocker bar is borne by the generator device such that it is deflectable, for example via an articulation.

The rocker bar can, in principle, be fixed on the same structural part of the steering arrangement with which the pinging hammer, in particular during pinging, can also be brought into contact. However, it is also conceivable for the rocker bar to be fixed on a first structural part of the steering arrangement, and the pinging hammer can be brought into contact with or impinges against another structural part of the steering arrangement.

As generator devices, vibrators or other generators of mechanical vibrations or pinging signals can be considered. These can be, for example, piezoelectric oscillators or magnetic coil configurations or, preferably electric, motors for moving, preferably for rotating, an unbalanced mass or an eccentric. Such generator devices for vibrations are known per se in prior art and are here only explained by example in different embodiment forms.

BRIEF DESCRIPTION OF THE DRAWINGS

Further details and features of preferred embodiments of the invention are evident based on the following description of the Figures, in which:

FIG. 2 shows a first embodiment according to the invention,

FIG. 3 shows a second embodiment according to the invention,

FIG. 4 shows a third embodiment according to the invention,

FIG. 5 shows a fourth embodiment according to the invention,

FIG. 6 shows a fifth embodiment according to the invention, and

DETAILED DESCRIPTION OF THE PREFERRED EMBODIMENTS

Figure 1:
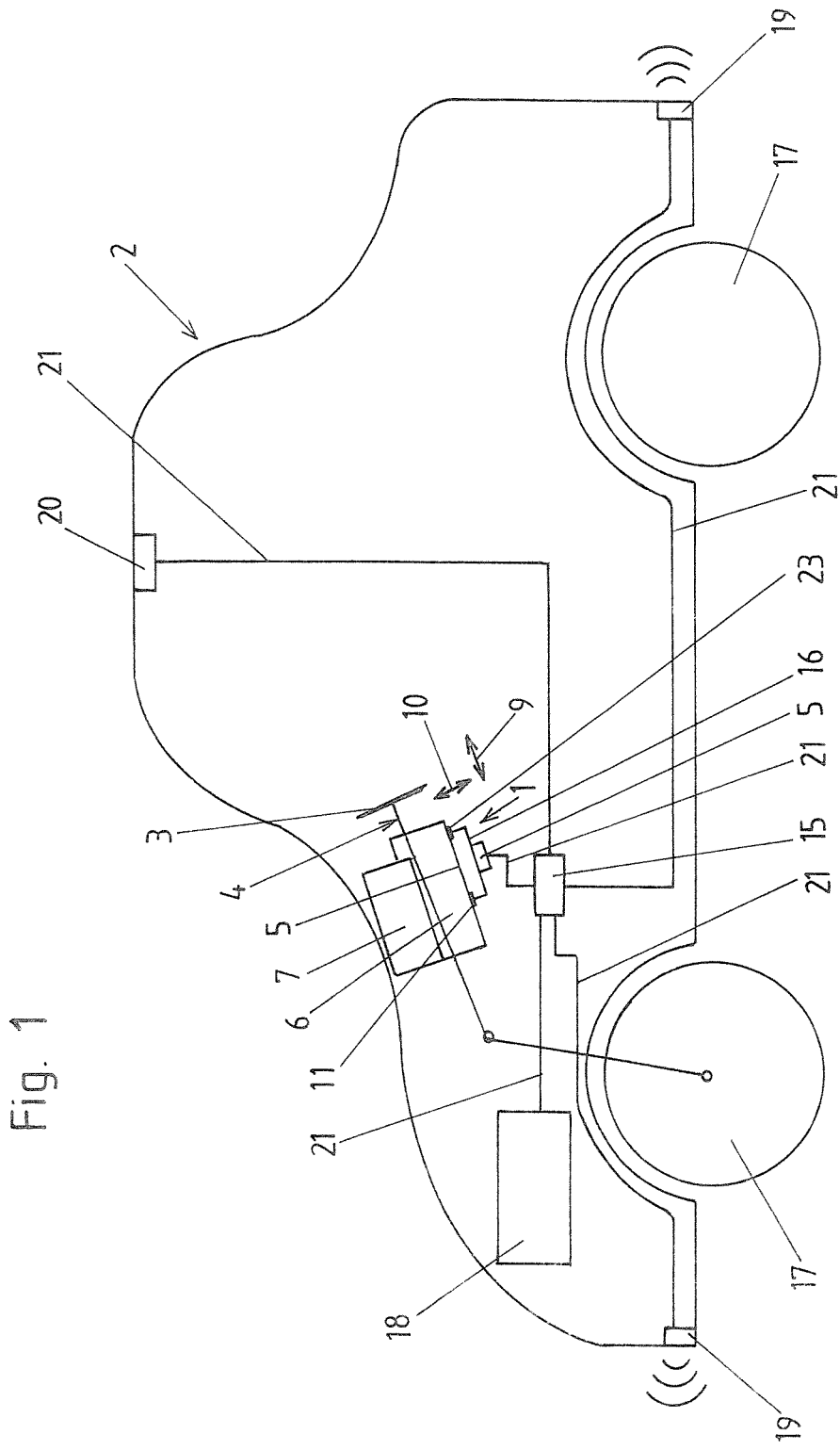
FIG. 1 is a schematic diagram.

FIG. 1, firstly, shows highly schematically the disposition of a steering arrangement 1 in a motor vehicle 2. The steering arrangement 1 includes herein a steering wheel 3 connected torsion-tight with a steering spindle 4. The steering spindle 4, in turn, is rotatably bearing supported in a jacket unit 6. For the securement of the jacket unit 6, a support part 7 is provided, which, for example, can be secured by bolting or welding or other securing measures on the motor vehicle body or a frame of the motor vehicle. The transmission of the rotational movement of the steering spindle 4 onto the front wheels 17 takes place as known in the prior art, and is not shown here in detail. To be able to adapt the position of the steering wheel 3 to the driver, a securement device 8 is provided (not shown in FIG. 1, but depicted in the embodiments of FIGS. 2 and 7). This device permits securing the jacket unit 6 bearing or supporting the steering spindle 4 in several positions on the support part 7. It is herein advantageous to implement the securement device 8 such that the steering wheel 3 is adjustable in the longitudinal direction 9 of the steering spindle and/or in the vertical direction 10 with respect to the depicted installation position.

In the variant shown schematically in FIG. 1, the rocker bar 16 is fixed in its fixing region 11 on the jacket unit 6. Between the fixing region 11 and the pinging hammer 23, the rocker bar 16 carries the generator device 5, via which it can be set into vibration, whereby the pinging hammer 23 impinges against the jacket unit 6.

The generator device 5 is connected with a regulation device 15 across a signal line 21. In the depicted embodiment, the regulation device 15 receives across corresponding signal lines 21 several parameters of the state of the motor vehicle in order to monitor these and, in the event of a discrepancy from predetermined nominal values or nominal value ranges, to generate a signal for activating the generator device 5. In this context are specifically shown on the front and the rear side of the motor vehicle 2 sensors 19 for determining the distance and/or the relative speed of other motor vehicles or obstacles located in front or behind the motor vehicle 2. The motor vehicle 2 shown in FIG. 1 includes also a position determination sensor 20. This sensor can be a Global Positioning System [GPS] antenna, known per se, of a navigation system. The regulation device 15, furthermore, receives across the corresponding signal line 21 also parameters of the state of the internal combustion engine 18. The depicted sensors, however, are only examples. It is in principle conceivable to combine with a steering arrangement in an embodiment according to the invention any monitoring mechanism known in the prior art for parameters of the state of the motor vehicle 2. The particular measured parameters are advantageously compared with nominal values or nominal value ranges. A discrepancy of the measured parameters from the nominal values or nominal value ranges can subsequently be analyzed by the regulation device 15 to the effect that the generator device 5 receives an activation signal across the signal line 21, whereupon it sets the rocker bar 16 into vibration and the pinging hammer 23 generates a haptic and/or an acoustic signal on the jacket unit 6 which is transmitted via the steering spindle 4 onto the steering wheel 3 and/or into the passenger compartment of the motor vehicle 2. In this manner, engine parameters, such as engine speed, oil pressure, temperature, different ignition parameters and the like, can be monitored and analyzed in order to generate a haptic and/or an acoustic signal in the event of malfunctions or other discrepancies from nominal values. This signal can also be utilized to direct the attention of the driver to an optical display. The same certainly applies also to other motor vehicle parameters such as tire pressure, level of fill of the gas tank, state of closure of the doors and other hatches and lids of the motor vehicle, operability of the illumination of the motor vehicle, etc. It is also feasible to monitor via the sensors 19 distance and relative speed in order to generate a corresponding signal in hazardous situations. Via the position determination sensor 20 and a corresponding regulation device 15, it is also feasible to track any possible discrepancies of the motor vehicle from the predetermined path. It can thus be provided that, in connection with a navigation system known per se, signals are generated if the motor vehicle leaves the predetermined path. In the same manner it can also be prevented that, for example due to the driver falling asleep, the motor vehicle leaves the trail or the road, corresponding haptic and/or acoustic signals are generated if the motor vehicle 2 leaves or abandons the trail or road. However, all of these, as stated, are only examples.

Advantageous embodiments provide that the generator device 5 is suitable, preferably as a function of activation by the regulation device, for generating at least two, preferably several, different signals or vibrations differing from the inactive state of the generator device 5. It is possible, for example, that the differing signals differ from one another in amplitude and/or frequency and/or duration and/or direction. It is hereby feasible to adapt the type, the duration, and/or the strength of haptic signal generated by the pinging hammer to the particular hazardous situation. In the case in which the nominal value is minimally exceeded or fallen below, for example a comparatively weak or short signal is generated which, with increasing hazard of the situation, is correspondingly amplified, extended or changed, thus in some form becomes more intensely perceptible to the user, thus becomes more insistent and frantic. It is also just as feasible to generate different signals for several monitored parameters in order for the user to be able to detect, based on the type of signal, in which of the monitored parameters a discrepancy from the nominal value or nominal value range has occurred.

FIG. 2 shows in a first concrete embodiment a steering arrangement according to the invention, wherein, only the upper region, relevant for this embodiment, of the steering arrangement is depicted. The steering arrangement 1 or the steering column comprises a steering spindle 4 of which one section adjoining a connection piece 22 for a steering wheel 3 or the like is rotatably bearing supported in a jacket unit 6. The jacket unit 6 is borne by a support part 7 that can be installed on the chassis of a motor vehicle. In the opened state of a securement device 8 the jacket unit 6 can be adjusted with respect to the support part 7, in the depicted embodiment into an adjustment direction 10.

Even if not shown in this embodiment, the securement device 8, as is known in the prior art, can also be implemented such that, additionally or alternatively to the movement direction 10, a second adjustment direction 9, in which the steering column is adjustable in the axial direction of the steering spindle 4, is also made possible. It is not essential to the invention whether an adjustability in the axial direction 9 as well as also in inclination or height direction 10 is possible.

The securement device 8 is opened and closed by means of a manual operating lever 12. For this purpose, this lever is fixedly connected with a clamp bolt 13. By swiveling the actuation lever 12 about the longitudinal axis of the clamp bolt 13, the securement device 8 is adjusted between the open and the closed state. This is known per se. FIG. 2 shows the position of the manual operating lever 12 in the closed position of the securement device 8 in which the steering spindle 4 is fixed in its position. The securement device 8 in the depicted embodiment acts under form closure via intermeshing toothings 39. Alternatively to a securement device 8 acting under form closure as shown here, securement devices 8 acting under frictional closure with and without lamellae, such as are known in prior art, can be equipped with a rocker bar 16 according to the invention. The type of securement of the jacket unit 6 with respect to the support part 7 in the closed state of the securement device 8 and the mechanism actuated by swiveling the manual operating lever 12 for opening and closing the securement device 8 is not subject matter of the present invention. The variant shown in FIG. 2 is only an example. Essential to the invention is rather the rocker bar 16, which in the example depicted here carries at its steering wheel-side end the pinging hammer 23, and at its end opposite thereto is fixed in the fixing region 11 by a bolt 24, a rivet or the like on the jacket unit 6. It is understood that, as a means of fixing in position, a welding connection, a soldering or any other type, known per se, of connecting two structural parts in the fixing region 11 can be provided. In the depicted embodiment the pinging hammer 23 can be brought in contact with the same structural part of the steering arrangement 1, namely with the jacket unit 6, at which the rocker bar 16 is also fixed in position. In the resting position depicted here, the pinging hammer 23 is in this embodiment in contact on that structural part of the steering arrangement, with which it can be brought into contact—here the jacket unit 6. As soon as the generator device 5 is set into operation, the rocker bar 16, and therewith also the pinging hammer 23, is set into vibrating movement, whereby the pinging hammer 23, as a function of the signal generated by the generator device 5, impinges on the jacket unit 6. In the depicted example, the rocker bar 16 is substantially comprised over its entire length of the elastic or vibration-capable lamella 25. This can be, for example a metal lamella, a plate spring or the like. The generator device 5 is borne by this lamella 25. The pinging hammer 23 is here formed unitarily onto the rocker bar 16 or the lamella 25. It is understood, however, that it can be fastened on the rocker bar 16 in any other known manner.

As is known per se, the jacket unit 6 assumes the bearing function for the steering spindle 4, since the later is bearing supported via the bearings 14 disposed in the jacket unit 6 or in its bearing bushing 26. In this context, it is thus provided that the steering spindle 4 is borne in an installation position of the steering arrangement in the motor vehicle by the jacket unit 6. The steering spindle 4 is consequently advantageously held in the motor vehicle by the jacket unit 6 against the force of gravity. To be able to realize such, it can, as explained here and generally known, be provided that the jacket unit 6 at least regionally encompasses a hollow volume in the form of a tunnel or a tube and the steering spindle 4 is carried through this hollow volume. For the bearing support of the steering spindle 4 in the jacket unit 6 at least one, preferably at least two of the above described bearings 14 can be disposed in or on the jacket unit 6. In addition to this bearing function, known per se, of the jacket unit 6, this unit in this embodiment is also utilized as a transmission device for the transmission of the pinging signal of the pinging hammer 23. The jacket unit 6 advantageously assumes herein the function of a resonance box through which haptic signals, thus signals perceptible through the tactile sense, and/or acoustic signals, thus audible signals, can be transmitted onto the steering spindle 4 and thus also onto the steering wheel 3 or a differently formed steering handle or into the interior of the passenger compartment of motor vehicle 2. For this purpose, the jacket unit 6 forming the resonance box has a resonance frequency which agrees with a frequency of the pinging signal generatable by the pinging hammer 23 or is at least so close to the frequency of the signal that the jacket unit 6 can be set into resonance.

In the embodiment according to FIG. 2, the rocker bar 16 is disposed in the front region proximal to the steering wheel atop the jacket unit 6. However, this does not need to be the case. The rocker bar 16 can certainly also be disposed in the center or in the rearward region, facing away from the steering wheel 3, of the jacket unit 6. The disposition of the rocker bar 16, relative to the depicted operating position, is, moreover, also feasible below or laterally on or in the jacket unit 6. The pinging hammer 23 can also impinge on the support part 7.

In the embodiment variant according to FIG. 3, the pinging hammer 23 can be directly brought into contact with the steering spindle 4. The pinging signal is thus introduced directly into the steering spindle 4. In the depicted embodiment as before, the rocker bar 16 has its fixing region 11 secured on the jacket unit 6. However, this is also only an example. Other securement options are also conceivable. Of advantage is herein in any case generally the securement of the rocker bar 16 on a non-rotational part of the steering arrangement 1, since in this case supply cables, not shown in the drawing, for the activation of the generator device 5 are not subject to a rotational movement. Alternatively to the variant depicted in FIG. 3, it is certainly also feasible to dispose the rocker bar 16, including the generator device 5 and pinging hammer 23, within the jacket unit 6.

In the embodiment according to FIG. 4 the fixing of the rocker bar 16 on the jacket unit 6 was also retained. In contrast to the previous embodiments, however, the pinging hammer 23 can be brought into contact with the bearing bushing 26 or it impinges on the generator device 5 during operation. The bearing bushing 26 is herein that part of the jacket unit 6 which supports the bearing 14. The bearing bushing 26 can be formed integrally with the rest of the jacket unit 6. Alternatively, it is also feasible to weld the bearing bushing 26 to the rest of the jacket unit 6. Furthermore, connections, such as bolting, riveting, joining connections, an interlinking peening, hammering or a connection via buttstraps or the like are conceivable. Ultimately, the connection between bearing bushing 26 and jacket unit 6 should advantageously be implemented such that the vibrations generated by the pinging hammer 23 are transmitted onto the jacket unit 6, in order to be able to attain the resonance box effect discussed preliminarily with respect to FIG. 2. This effect subsequently acts additionally to the direct transmission of the generated vibrations via the bearing bushing 26 and the bearing 14 onto the steering spindle 4. Depicted in the drawing are here, as is the case in all other embodiments, vibration directions 46 in which the pinging hammer 23 vibrates when the generator device 5 has been set into operation. As already shown in FIG. 3, in FIG. 4, due to the selected sectional representation, the structure of bearing 14 realized in this embodiment example is evident. This bearing, firstly, comprises an outer bearing ring 45, preferably disposed torsion-tight on the bearing bushing 26, in which outer ring the balls 43 run. These balls are stayed inwardly against inner bearing ring 44, which, during the rotation of the steering spindle 4 executes together with the steering spindle 4 a rotational movement relative to the outer bearing ring 45. The inner bearing ring 44 is here held, for example through the cone ring 42, on the steering spindle 4. Retaining ring 41 clamped tight on the steering spindle 4 under force or form closure, stays the cone ring 42 in the axial direction of the steering spindle 4 and thereby prevents the thus structured bearing 14 from being moved apart in the axial direction of the steering spindle 4. In the arrangement depicted in FIG. 4, a large portion of the pinging signal is consequently introduced directly from the bearing bushing 26 via the thus structured bearing 14 into the steering spindle 4.

The embodiment depicted in FIG. 5 also in a sectional representation differs from that according to FIG. 4 by a spacer ring 40 disposed between the cone ring 42 and the retaining ring 41, onto which spacer ring the pinging hammer impacts. The spacer ring 40 rotates together with the inner bearing ring 44, the cone ring 42 and the retaining ring 41 with the steering spindle 4. The retaining ring 41 serves also in this embodiment for staying the thus structured bearing 14 in the axial direction of the steering spindle 4 against the outer bearing ring 45 held on the bearing bushing 26.

In comparison to FIG. 5, FIG. 6 depicts a minimally modified variant. Here, the cone ring 42 is integrated directly in spacer ring 40'. The function otherwise corresponds to that according to FIG. 5. The thus implemented spacer ring 40' can be produced, for example, integrally as a formed sheet metal part.

In particular in physical forms, such as for example those depicted in FIGS. 3, 5 and 6, in which the pinging hammer 23 impacts on parts rotatable relative to the pinging hammer 23, such as for example the steering spindle 4, it can be provided that the pinging hammer 23 is implemented as a rotatable element or includes such a rotatable element, such as for example a roller. The rotational axis of this rotatable element or the roller should in this case be advantageously oriented parallel to the rotational axis of the steering spindle or should be orientable parallel to the rotational axis of the steering spindle, in order for the pinging hammer 23 not to hinder the rotational movement of the steering spindle 4.

Figure 7:
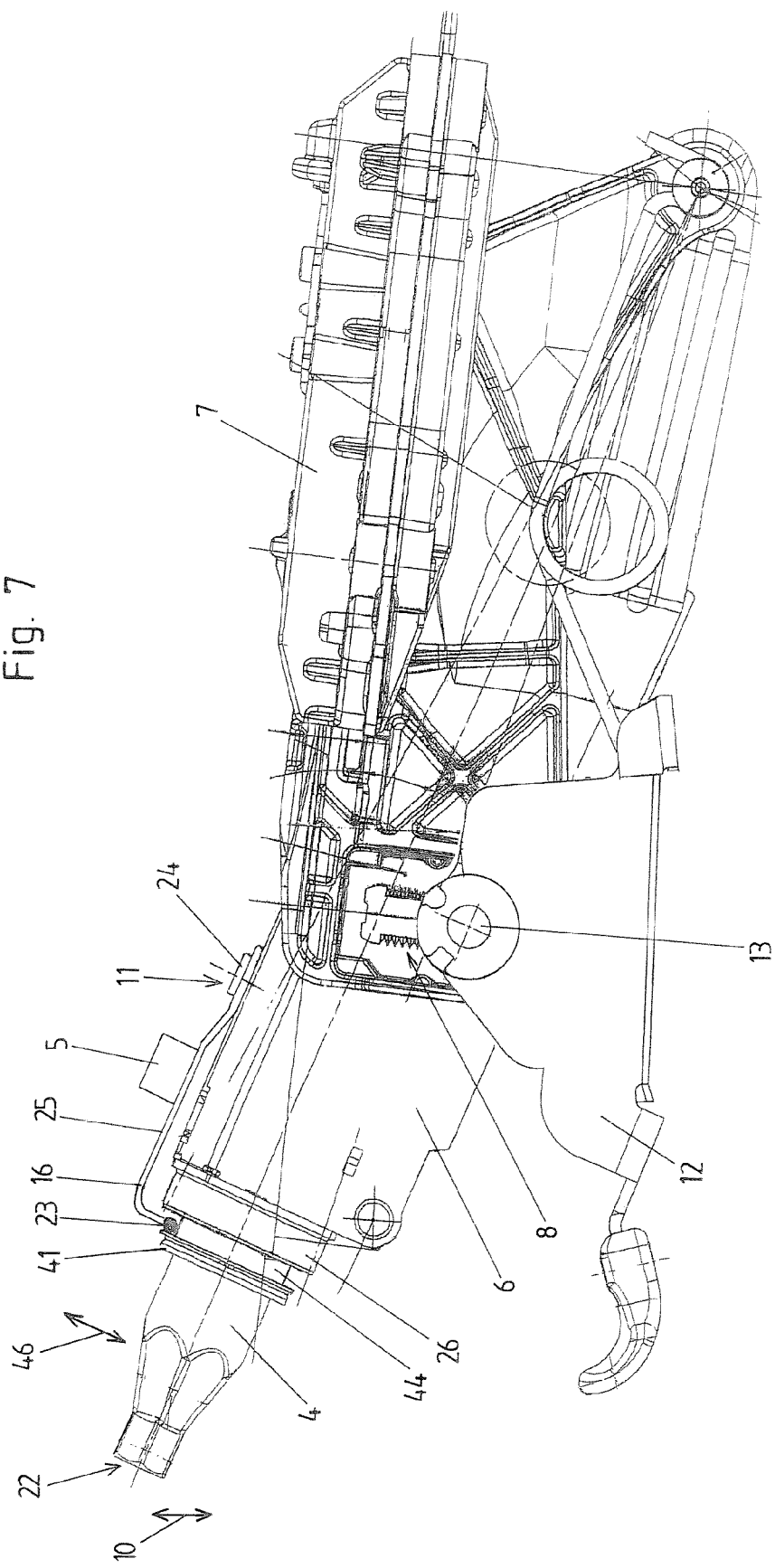
FIG. 7 shows a sixth embodiment according to the invention.

FIG. 7 shows in an external view analogous to FIG. 2 a variant in which, instead of cone ring 42 and spacer ring 40, the inner bearing ring 44 is extended so far that the pinging hammer 23 can impact onto the inner bearing ring 44. Corresponding outward protrusions, not shown in detail here, ensure that the balls 43 are herein held in their position. Axial dislocation of the entire inner bearing ring 44 is, again, avoided through the retaining ring 41 engaging under force or form closure on the steering spindle 4.

In all embodiments depicted in FIGS. 4 to 7, the signal generated by the pinging hammer 23 is transmitted directly onto the steering spindle 4 via the particular interspaced structural parts. On the other hand, through a correspondingly solid mechanical linkage of the bearing 14 to the jacket unit 6, this jacket unit 6 can, however, also be set into vibration wherewith, as explained in the introduction, it can also be utilized as a resonance box.

It should be pointed out here that the depicted variants are certainly only selected embodiments of the invention. The rocker bar 16 can, furthermore, certainly also be fixed to other structural parts of the steering arrangement 1 or it should be feasible to bring the pinging hammer 23 also into contact with other structural parts of the steering arrangement 1. It may in particular be pointed out that the support part 7 or the securement device 8 can certainly also be provided as a counterpiece for the pinging hammer 23 or as a securement option for the rocker bar 16.

Apart from the properties of the generator device 5, the implementation form of the rocker bar 16, the lamella 25 and, in particular, also the form and material choice of the pinging hammer 23 have an effect on the manner in which the pinging signal is haptically and/or acoustically perceived. With respect to the pinging hammer 23, via the material choice, in particular the pitch, however also the strength, of the signal can be jointly controlled. It is, for example, feasible to implement the pinging hammer 23 as a metal head or to cushion it, for example by coating it with synthetic material or the like, or to select at the outset another or softer material for the pinging hammer 23.

In the depicted and also other embodiment variants of the invention, it is preferably prevented through suitable measures that the pinging hammer 23, for reasons of jarring or vibrations, impacts inadvertently against a structural part of the steering arrangement when such is not desired at all. This prevention can be achieved, for example, by spacing the pinging hammer 23 in its resting position so far apart from the part against which it is to impinge that undesired pinging through oscillations or vibrations cannot occur. An alternative measure would also be to clamp the pinging hammer 23 solidly in its resting position and to enable it only if, excited through the generator device 5, it is intended to impinge.

Figure 8:
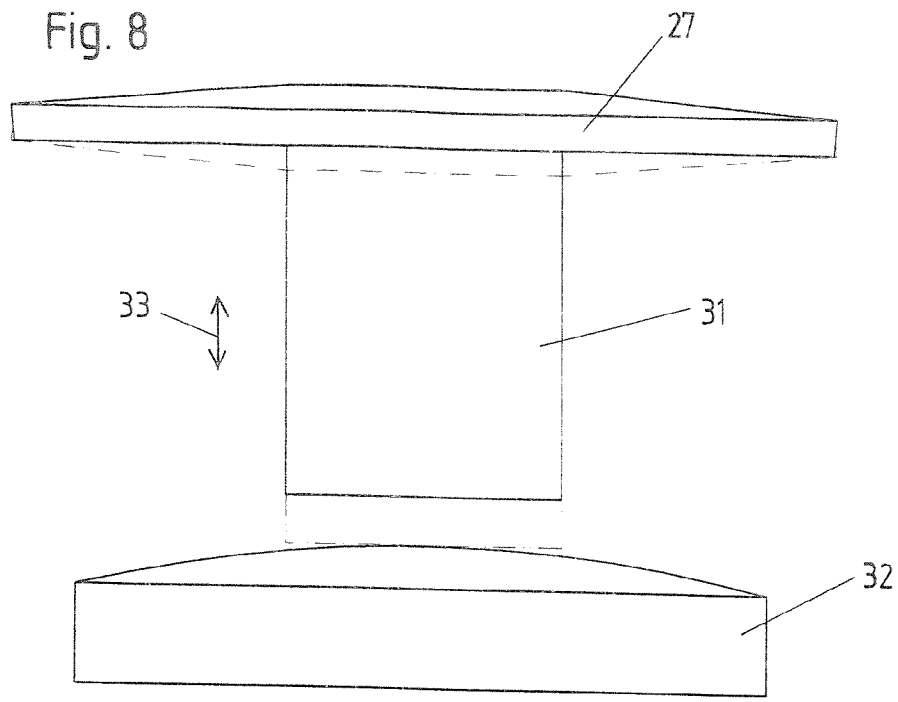
FIGS. 8 to 11 show several different examples of generator devices.
Figure 9:
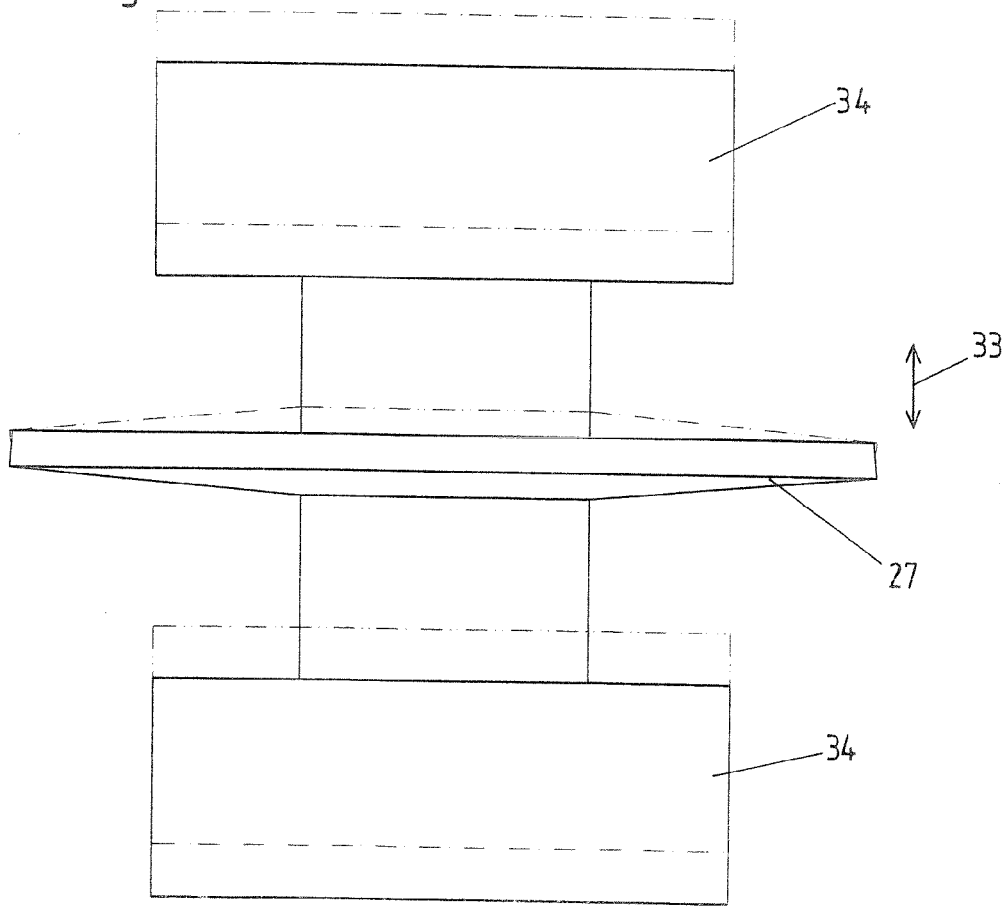
Figure 10:
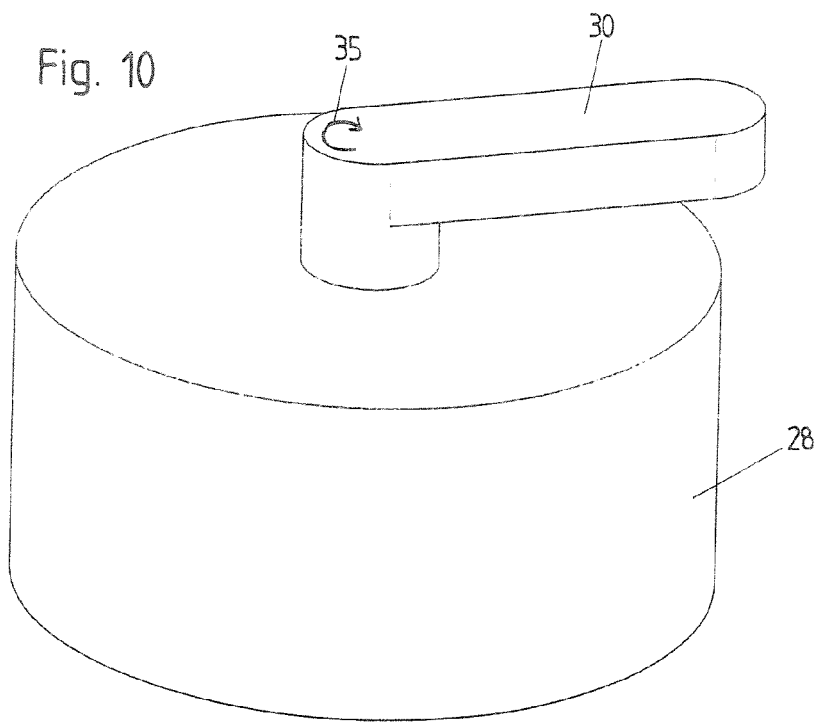
Figure 11:
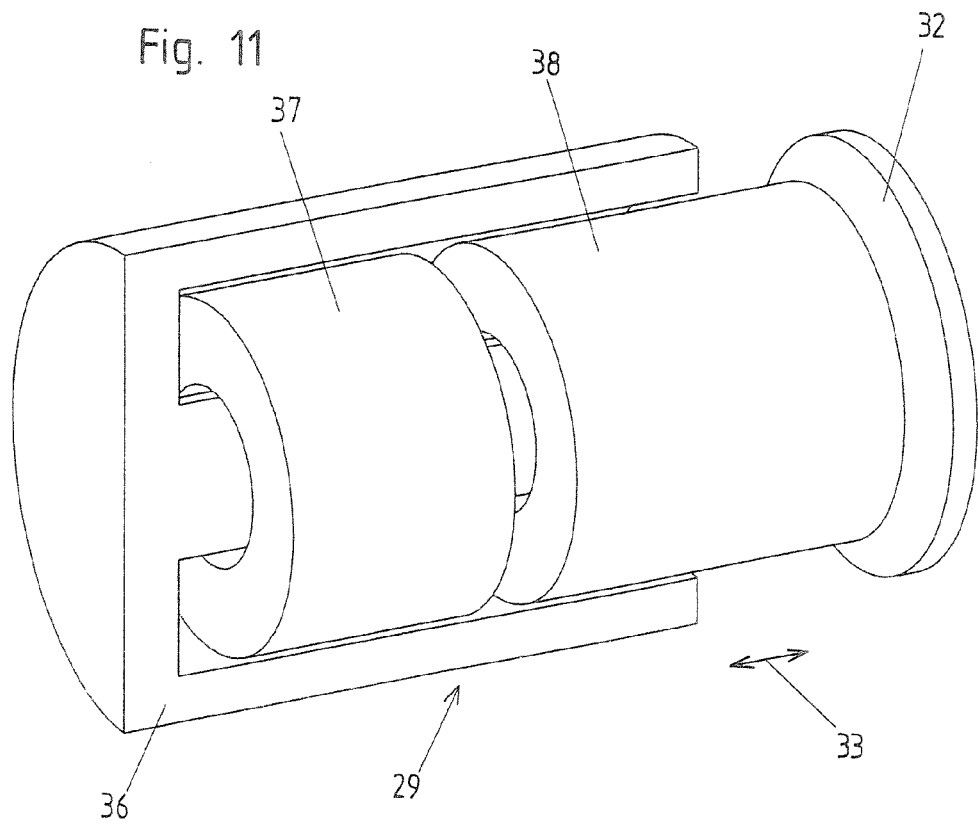

In the thus far described embodiments each of the generator devices 5 is only depicted in highly simplified form. As already explained in the introduction, as the generator device 5 any suitable vibration generator is considered. In the following, different types of generator devices 5 are explained by example. FIG. 8 shows a variant in which as the source a piezoelectric oscillator 27 is provided. Through the corresponding excitation, this oscillator sets hammer piece 31 into single-stroke movement or vibration movements 33, whereby this hammer, in turn, strikes anvil 32 via which the thus generated signal is conducted further onto the rocker bar 16, not depicted here. The hammer piece 31 can herein be fixed in position on the piezoelectric oscillator 27. The solid line drawings and those shown as dashed line show, as is also the case in the embodiment example according to FIG. 9, the particular maximally deflected positions of the particular structural parts 27 and 31 or 34. FIG. 9 shows a variant of a generator device 5, in which on the piezoelectric oscillator 27 two counterweights 34 are disposed which, together with the piezoelectric oscillator 27, are set into vibrating movement 33 and thus amplify the signal. The transmission of the vibration onto a housing, not shown here, of the generator device 5, and therewith lastly onto the rocker bar 16, takes place via the suspension of the piezoelectric oscillator 27. FIG. 10 shows an example with a, preferably electric, motor 28. This motor 28 generates a rotational movement 35 of eccentric 30. Through its mass or unbalanced mass the eccentric 30 generates herein a mechanical vibration which is transferred further via the motor 28 or its housing. FIG. 11 shows a magnetic coil configuration 29 for a generator device 5. On pole shoe 36 forming the magnetic core are seated a magnetizable core coil 37 and a magnetizable plunger coil 38. One of the coils is fixed in position on the pole shoe, the other is bearing supported such that it is movable in the direction of the vibration movement 33. Through the corresponding poling of the coils, the movable coil is set into a single movement or into a vibrating movement 33, whereby corresponding strokes are exerted onto the anvil 32 or the anvil is set into vibration. The haptic signal is transferred further via the anvil 32. It is certainly also conceivable herein for one of the coils to be replaced by a permanent magnet. It is equally well conceivable to actuate the rocker bar with a generator device 5 according to the bell principle known per se. Such a generator device 5 comprises at least one magnetic coil and at least one contact breaker point, wherein the magnetic coil attracts or repels the elastically deflectable rocker bar 16 until the rocker bar 16 or a structural part fastened thereon contacts the contact breaker point and switches off the magnetic coil wherewith the rocker bar, and therewith also the pinging hammer, is set into vibration.

In the depicted embodiments the invention was illustrated in conjunction with a steering arrangement 1 for land-bound power-driven motor vehicles, such as for example passenger cars and trucks. It is understood that steering arrangements according to the invention can also be employed for powered two-wheelers such as motorcycles, mopeds and the like. However, the invention is not necessarily restricted only to steering arrangements for land-bound motor vehicles. It is in principle also feasible to employ corresponding steering arrangements, to mention only a few examples, also for airplanes, boats or ships.

The invention claimed is:

1. A steering arrangement for a motor vehicle, said steering arrangement comprising:
    a rotatable steering handle;
    a steering spindle connected torsion-tight with the rotatable steering handle;
    at least one generator device for at least one mechanical vibration; and
    at least one rocker bar fixed on a structural part of the steering arrangement in a fixing region,
    wherein a pinging hammer is deflectably held on the rocker bar with respect to the fixing region, and the rocker bar for deflection of the pinging hammer is connected with the generator device,
    wherein the pinging hammer is capable of being brought into contact with a structural part of the steering arrangement, and
    wherein the steering spindle is rotatably bearing supported in a jacket unit of the steering arrangement and the rocker bar is fixed with the fixing region on the jacket unit.

2. The steering arrangement as claimed in claim 1, wherein the rocker bar comprises or is at least one elastic lamella on which the pinging hammer is held directly or indirectly.

3. The steering arrangement as claimed in claim 2, wherein the lamella can be set into mechanical vibration by the generator device.

4. The steering arrangement as claimed in claim 1, wherein the pinging hammer is disposed on the rocker bar spaced apart from the fixing region.

5. The steering arrangement as claimed in claim 1, wherein the pinging hammer is disposed on an end of the rocker bar opposite the fixing region or on a lamella on the rocker bar.

6. The steering arrangement as claimed in claim 1, wherein the generator device engages on the rocker bar between the fixing region and the pinging hammer.

7. The steering arrangement as claimed in claim 6, wherein the generator device engages on the rocker bar in the proximity of a lamella of the rocker bar.

8. The steering arrangement as claimed in claim 1, wherein the generator device is borne by the rocker bar or a lamella of the rocker bar.

9. The steering arrangement as claimed in claim 1, wherein the generator device is borne exclusively by the rocker bar or exclusively by a lamella of the rocker bar.

10. The steering arrangement as claimed in claim 1, wherein the pinging hammer in an operating state impinges on the structural part of the steering arrangement.

11. The steering arrangement as claimed in claim 1, wherein the rocker bar is fixed on the same structural part of the steering arrangement with which the pinging hammer is capable of being brought into contact.

12. The steering arrangement as claimed in claim 1, wherein the rocker bar is fixed on a first structural part of the steering arrangement, and the pinging hammer is capable of being brought into contact with another structural part of the steering arrangement.

13. The steering arrangement as claimed in claim 1, wherein the steering spindle is rotatably bearing supported in a jacket unit of the steering arrangement, and the pinging hammer is capable of being brought directly into contact with the jacket unit.

14. The steering arrangement as claimed in claim 1, wherein the steering spindle is supported in a bearing bushing supporting a bearing of the steering arrangement, and the pinging hammer is capable of being brought directly into contact with the bearing bushing.

15. The steering arrangement as claimed in claim 1, wherein the pinging hammer is capable of being brought directly into contact with the steering spindle.

16. The steering arrangement as claimed in claim 1, wherein the steering spindle is encompassed by an inner bearing ring or is connected torsion-tight therewith, and the pinging hammer is capable of being brought directly into contact with the inner bearing ring.

17. The steering arrangement as claimed in claim 1, wherein the steering spindle is encompassed by a spacer ring which is pressed, by a retaining ring secured on the steering spindle under force or form closure, against a bearing receiving the steering spindle, wherein the pinging hammer is capable of being brought directly into contact with the spacer ring.

18. The steering arrangement as claimed in claim 1, wherein the pinging hammer is implemented as a rotatable element or comprises such a rotatable element.

19. The steering arrangement as claimed in claim 18, wherein the rotatable element is a roller.

20. The steering arrangement as claimed in claim 1, wherein the rotatable steering handle is a rotatable steering wheel.

21. The steering arrangement as claimed in claim 1, wherein the mechanical vibration is a haptic signal.

\* \* \* \* \*